United States Patent
Goel (10) Patent No.: US 10,228,152 B2
(45) Date of Patent: Mar. 12, 2019

(54) METHOD AND SYSTEM FOR OPTIMIZING A SPEED OF AT LEAST ONE OF A VARIABLE SPEED COMPRESSOR AND A VARIABLE SPEED CIRCULATION FAN TO IMPROVE LATENT CAPACITY

(71) Applicant: Lennox Industries Inc., Richardson, TX (US)

(72) Inventor: Rakesh Goel, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 16/120,573

(22) Filed: Sep. 4, 2018

(65) Prior Publication Data

US 2018/0372359 A1    Dec. 27, 2018

Related U.S. Application Data

(63) Continuation of application No. 15/177,585, filed on Jun. 9, 2016, now Pat. No. 10,072,862.

(51) Int. Cl.
*F24F 11/00* (2018.01)
*F25B 49/02* (2006.01)
(Continued)

(52) U.S. Cl.
CPC .............. *F24F 11/30* (2018.01); *F24F 11/72* (2018.01); *F24F 11/77* (2018.01); *F25B 49/022* (2013.01);
(Continued)

(58) Field of Classification Search
CPC ...... F25B 49/02; F25B 49/022; F25B 49/025; F25B 49/027; F25B 2600/025;
(Continued)

(56) References Cited

U.S. PATENT DOCUMENTS

| 4,408,713 A | 10/1983 | Iijima et al. |
| 4,744,223 A | 5/1988 | Umezu |

(Continued)

FOREIGN PATENT DOCUMENTS

| AU | 2011100169 A4 | 3/2011 |
| CA | 2775540 A1 | 11/2012 |

(Continued)

OTHER PUBLICATIONS

U.S. Appl. No. 14/954,531, Goel et al.

(Continued)

*Primary Examiner* — Jonathan Bradford
(74) *Attorney, Agent, or Firm* — Winstead PC (57) ABSTRACT

An HVAC system includes an evaporator coil and a metering device. The HVAC system includes a variable-speed circulation fan and a condenser coil fluidly coupled to the metering device. A variable-speed compressor is fluidly coupled to the condenser coil and the evaporator coil. A controller is operatively coupled to the variable-speed compressor and the variable-speed circulation fan. A second temperature sensor is disposed in an enclosed space. The second temperature sensor measures temperature of the enclosed space and transmits the temperature of the enclosed space to the controller. The controller determines if the temperature of the enclosed space is below a minimum threshold. Responsive to a determination that the temperature of the enclosed space is below the minimum threshold, the controller modulates at least one of a speed of the variable-speed compressor and the variable-speed circulation fan to lower a discharge air temperature.

20 Claims, 5 Drawing Sheets

(51) Int. Cl.
  *F24F 11/30* (2018.01)
  *F24F 11/77* (2018.01)
  *F24F 11/72* (2018.01)
  *F24F 11/85* (2018.01)
  *F24F 140/20* (2018.01)
  *F24F 110/10* (2018.01)

(52) U.S. Cl.
  CPC .......... *F24F 11/85* (2018.01); *F24F 2110/10* (2018.01); *F24F 2140/20* (2018.01); *F25B 2600/0253* (2013.01); *F25B 2600/112* (2013.01); *F25B 2700/2104* (2013.01); *F25B 2700/21173* (2013.01)

(58) Field of Classification Search
  CPC ........ F25B 2600/0253; F25B 2600/112; F25B 2700/2104; F25B 2700/21173; F24F 11/72; F24F 11/74; F24F 11/77; F24F 11/80; F24F 2110/10
  See application file for complete search history.

(56) References Cited

U.S. PATENT DOCUMENTS

| | | | |
|---|---|---|---|
| 4,813,474 | A | 3/1989 | Umezu |
| 4,873,649 | A | 10/1989 | Grald et al. |
| 5,058,388 | A | 10/1991 | Shaw et al. |
| 5,062,276 | A | 11/1991 | Dudley |
| 5,095,715 | A | 3/1992 | Dudley |
| 5,481,166 | A | 1/1996 | Moreira |
| 5,832,744 | A | 11/1998 | Dorste et al. |
| 6,055,819 | A | 5/2000 | Kang |
| 6,070,110 | A | 5/2000 | Shah et al. |
| 6,427,454 | B1 | 8/2002 | West |
| 6,789,881 | B2 | 9/2004 | Silverbrook |
| 6,792,767 | B1 | 9/2004 | Pargeter et al. |
| 6,826,921 | B1 | 12/2004 | Uselton |
| 6,826,922 | B2 | 12/2004 | Patel et al. |
| 7,770,405 | B1 | 8/2010 | Dillon |
| 8,397,522 | B2 | 3/2013 | Springer et al. |
| 8,689,582 | B2 | 4/2014 | Birkelund et al. |
| 8,948,918 | B2 | 2/2015 | Chamorro et al. |
| 2005/0056042 | A1 | 3/2005 | Bourne et al. |
| 2005/0241325 | A1 | 11/2005 | Olney |
| 2005/0278071 | A1 | 12/2005 | Durham |
| 2008/0098756 | A1 | 5/2008 | Uselton |
| 2008/0245083 | A1 | 10/2008 | Tutunoglu et al. |
| 2008/0307803 | A1 | 12/2008 | Herzon |
| 2009/0192650 | A1 | 7/2009 | Tonner |
| 2009/0205354 | A1 | 8/2009 | Brown |
| 2009/0277193 | A1 | 11/2009 | Springer et al. |
| 2010/0082161 | A1 | 4/2010 | Patch |
| 2010/0082162 | A1 | 4/2010 | Mundy et al. |
| 2010/0307733 | A1 | 12/2010 | Karamanos et al. |
| 2011/0083454 | A1 | 4/2011 | Kopko et al. |
| 2011/0208325 | A1 | 8/2011 | Liu |
| 2012/0137713 | A1 | 6/2012 | Duraisamy et al. |
| 2012/0303165 | A1 | 11/2012 | Qu et al. |
| 2012/0318007 | A1 | 12/2012 | Lukasse et al. |
| 2013/0061619 | A1 | 3/2013 | Saitou et al. |
| 2013/0213064 | A1 | 8/2013 | Gomes et al. |
| 2013/0255297 | A1 | 10/2013 | Matsuoka et al. |
| 2014/0131009 | A1 | 5/2014 | Zhou et al. |
| 2014/0245762 | A1 | 9/2014 | Schlesinger |
| 2014/0345307 | A1 | 11/2014 | Bagley et al. |
| 2014/0360211 | A1 | 12/2014 | Hovel et al. |
| 2015/0021005 | A1 | 1/2015 | Land, III |
| 2015/0075766 | A1 | 3/2015 | Alston |
| 2015/0233623 | A1 | 8/2015 | Izadi-Zamanabadi et al. |
| 2015/0323423 | A1 | 11/2015 | Alsaleem |
| 2015/0337831 | A1 | 11/2015 | Zhou et al. |
| 2016/0273815 | A1 | 9/2016 | Downie et al. |

FOREIGN PATENT DOCUMENTS

| | | |
|---|---|---|
| WO | WO-8912269 A1 | 12/1989 |
| WO | WO-97/32167 A1 | 9/1997 |

OTHER PUBLICATIONS

U.S. Appl. No. 14/954,558, Goel et al.
U.S. Appl. No. 15/044,243, Goel et al.
U.S. Appl. No. 15/177,639, Goel.
U.S. Appl. No. 15/177,585, Goel.
Research and Development Roadmap for Emerging HVAC Technologies—Goetzier et al. (Oct. 2014).

METHOD AND SYSTEM FOR OPTIMIZING A SPEED OF AT LEAST ONE OF A VARIABLE SPEED COMPRESSOR AND A VARIABLE SPEED CIRCULATION FAN TO IMPROVE LATENT CAPACITY

CROSS-REFERENCE TO RELATED APPLICATIONS

This application is a continuation of U.S. patent application Ser. No. 15/177,585, filed on Jun. 9, 2016. U.S. patent application Ser. No. 15/177,585 is incorporated herein be reference. U.S. patent application Ser. No. 14/954,531, filed Nov. 30, 2015. U.S. patent application Ser. No. 14/954,558, filed Nov. 30, 2015, U.S. patent application Ser. No. 15/044,243, filed Feb. 16, 2016, and U.S. patent application Ser. No. 15/177,639, filed Jun. 9, 2016 are each incorporated herein by reference.

TECHNICAL FIELD

The present invention relates generally to heating, ventilation, and air conditioning (HVAC) systems and more particularly, but not by way of limitation, to optimizing discharge air temperature and compressor speed during dehumidification.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). To direct operation of the circulation fan and other components, HVAC systems include a controller. In addition to directing operation of the HVAC system, the controller may be used to monitor various components, (i.e. equipment) of the HVAC system to determine if the components are functioning properly.

SUMMARY

In one aspect, the present invention relates to a heating, ventilation, and air conditioning (HVAC) system. The HVAC system includes an evaporator coil and a metering device fluidly coupled to the evaporator coil. The HVAC system includes a variable-speed circulation fan for circulating air around the evaporator coil and a condenser coil fluidly coupled to the metering device. A variable-speed compressor is fluidly coupled to the condenser coil and the evaporator coil. A controller is operatively coupled to the variable-speed compressor and the variable-speed circulation fan. A second temperature sensor is disposed in an enclosed space. The second temperature sensor is configured to measure temperature of the enclosed space and transmit the temperature of the enclosed space to the controller. The controller is configured to determine if the temperature of the enclosed space is below a minimum threshold. Responsive to a determination that the temperature of the enclosed space is below the minimum threshold, the controller is configured to modulate at least one of a speed of the variable-speed compressor and the variable-speed circulation fan to lower a discharge air temperature from a first setpoint temperature to a second setpoint temperature.

In another aspect, the present invention relates to a method of optimizing latent capacity of an HVAC system. The method includes measuring, using a first temperature sensor, a discharge air temperature and measuring, using a second temperature sensor, an air temperature of an enclosed space. The method also includes determining, using a controller, if the temperature of the enclosed space is below a minimum threshold. Responsive to a determination that the temperature of the enclosed space is below the minimum threshold, a speed of at least one of a variable-speed compressor and a variable-speed circulation fan is modulated to lower the discharge air temperature from a first setpoint temperature to a second setpoint temperature.

In one aspect, the present invention relates to a heating, ventilation, and air conditioning (HVAC) system. The HVAC system includes an evaporator coil and a metering device fluidly coupled to the evaporator coil. The HVAC system includes a variable-speed circulation fan for circulating air around the evaporator coil and a condenser coil fluidly coupled to the metering device. A variable-speed compressor is fluidly coupled to the condenser coil and the evaporator coil. A controller is operatively coupled to the variable-speed compressor and the variable-speed circulation fan. A second temperature sensor is disposed in an enclosed space. The second temperature sensor is configured to measure temperature of the enclosed space and transmit the temperature of the enclosed space to the controller. The controller is configured to determine if the temperature of the enclosed space is below a minimum threshold. Responsive to a determination that the temperature of the enclosed space is below the minimum threshold, the controller is configured to modulate at least one of a speed of the variable-speed compressor and the variable-speed circulation fan to lower a discharge air temperature from a first setpoint temperature to a second setpoint temperature. The controller is configured to determine if the temperature of the enclosed space is above a maximum threshold. Responsive to a determination that the temperature of the enclosed space is above the maximum threshold, the controller is configured to modulate at least one of the speed of the variable-speed compressor and the variable-speed circulation fan to maintain the discharge air temperature at the first setpoint temperature.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. In a typical embodiment, sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions. Normal cooling Cubic Feet per Minute ("CFM") refers to an industry standard indoor blower speed for a particular set of operating conditions. Normal cooling CFM is defined by Equation 1.

$$\dot{V}_{Normal} = \frac{F_a}{F_R}(tonnage)(K) \qquad \text{Equation 1}$$

Where $\dot{V}_{Normal}$ is the Normal cooling CFM, $F_a$ is an actual speed of a variable-speed compressor (Hz), $F_R$ is the rated speed of the variable-speed compressor (Hz), tonnage is the rated tonnage of the HVAC system, and K is a multiplier. In a typical embodiment, the multiplier ranges from approximately 350 to approximately 450 depending on design considerations and application. An exemplary multiplier of 400 is used herein for purposes of discussion. In a typical embodiment, the rated speed ($F_R$) is a known constant associated with a particular variable-speed compressor and the rated tonnage is a known constant associated with a particular HVAC system.

Sensible cooling load refers to an amount of heat that must be removed from the enclosed space to accomplish a desired temperature change of the air within the enclosed space. The sensible cooling load is reflected by a temperature within the enclosed space as read, for example, on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read, for example, on a wet-bulb thermometer. Setpoint or temperature setpoint refers to a target temperature setting of the HVAC system as set by a user or automatically based on a pre-defined schedule. Discharge air temperature refers to a temperature of air leaving an evaporator coil. Typically, discharge air temperature is maintained at a constant pre-set level. Discharge air temperature varies with indoor dry-bulb air temperature, indoor wet-bulb air temperature, indoor air flow rate, cooling capacity of the HVAC system, and other design parameters.

When there is a high sensible cooling load such as, for example, when outside-air temperature is significantly warmer than an inside-air temperature setpoint, the HVAC system will continue to operate in an effort to effectively cool and dehumidify the conditioned air. Such operation is commonly referred to as "cooling mode." When there is a low sensible cooling load but high relative humidity such as, for example, when the outside air temperature is relatively close to the inside air temperature setpoint, but the outside air is considerably more humid than the inside air, additional steps must be undertaken to increase the moisture-removal capability of the HVAC system to avoid occupant discomfort. This is commonly referred to as "dehumidification mode." As will be described in more detail below, re-heat dehumidification is one method to remove additional moisture from the conditioned air. Additionally, it has been found that limiting indoor blower speed to a speed below Normal cooling CFM ensures that the S/T ratio does not rise above, for example, 0.8. Maintaining the S/T ratio below, for example, 0.8 maintains latent capacity of the HVAC system. Additionally, it has been found that, during conditions when there is a low sensible cooling load, lowering the discharge air temperature according to the temperature of the enclosed space lowers the S/T ratio and increases the latent capacity of the HVAC system.

Additionally, in many situations, lowering discharge air temperature causes the HVAC system to run for longer periods of time. Longer run times of the HVAC system reduces on/off cycling and prevent re-evaporation of removed moisture into discharge air and enhances dehumidification effectiveness.

Figure 1:
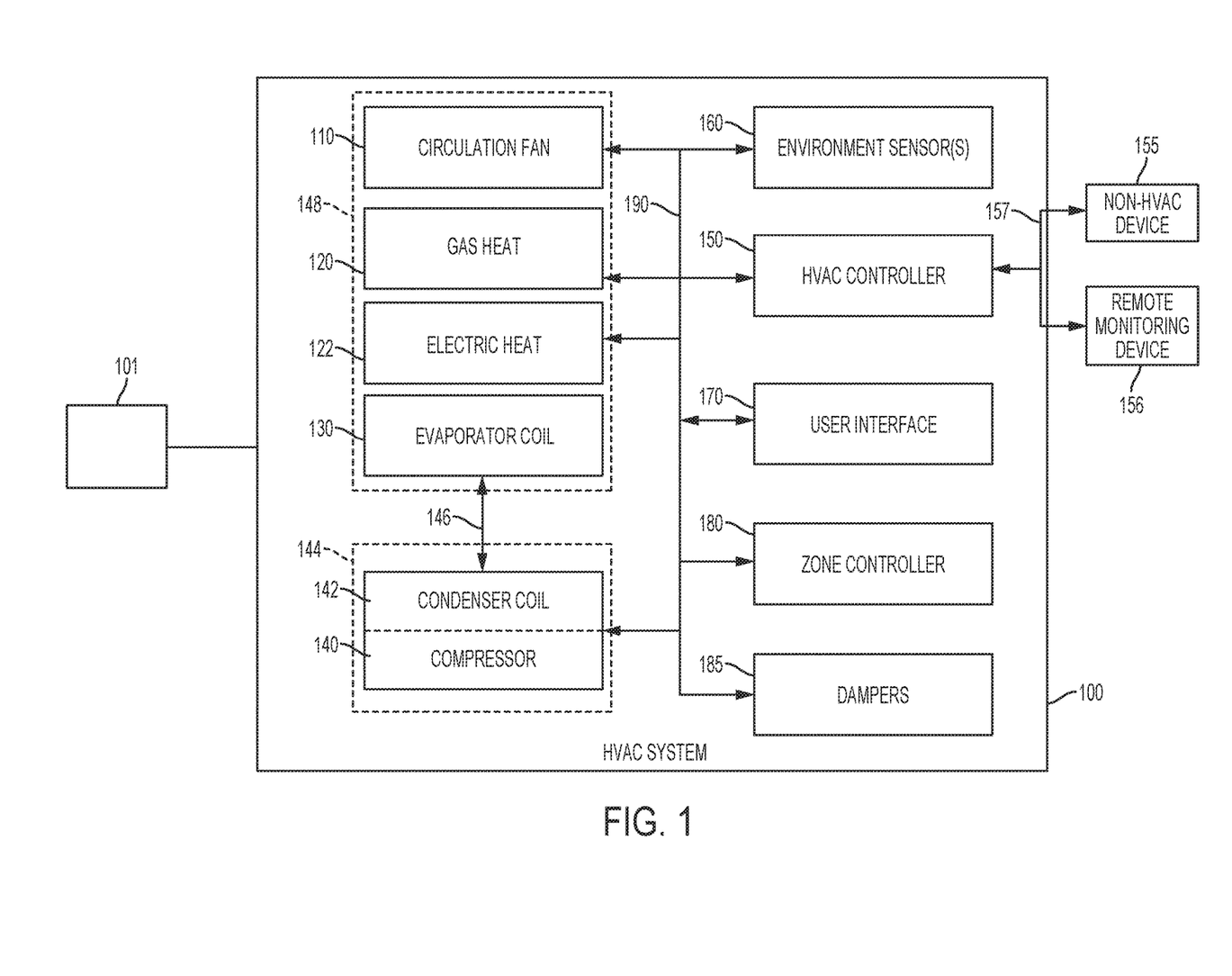
FIG. 1 is a block diagram of an exemplary HVAC system.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101. In a typical embodiment, the enclosed space 101 is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a variable-speed circulation fan 110, a gas heat 120, electric heat 122 typically associated with the variable-speed circulation fan 110, and a refrigerant evaporator coil 130, also typically associated with the variable-speed circulation fan 110. The variable-speed circulation fan 110, the gas heat 120, the electric heat 122, and the refrigerant evaporator coil 130 are collectively referred to as an "indoor unit" 148. In a typical embodiment, the indoor unit 148 is located within, or in close proximity to, the enclosed space 101. The HVAC system 100 also includes a variable-speed compressor 140 and an associated condenser coil 142, which are typically referred to as an "outdoor unit" 144. In various embodiments, the outdoor unit 144 is, for example, a rooftop unit or a ground-level unit. The variable-speed compressor 140 and the associated condenser coil 142 are connected to an associated evaporator coil 130 by a refrigerant line 146. In a typical embodiment, the variable-speed compressor 140 is, for example, a single-stage compressor, a multi-stage compressor, a single-speed compressor, or a variable-speed compressor. The variable-speed circulation fan 110, sometimes referred to as a blower, is configured to operate at different capacities (i.e., variable motor speeds) to circulate air through the HVAC system 100, whereby the circulated air is conditioned and supplied to the enclosed space 101.

Still referring to FIG. 1, the HVAC system 100 includes an HVAC controller 150 that is configured to control operation of the various components of the HVAC system 100 such as, for example, the variable-speed circulation fan 110, the gas heat 120, the electric heat 122, and the variable-speed compressor 140 to regulate the environment of the enclosed space 101. In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101.

The HVAC controller 150 may be an integrated controller or a distributed controller that directs operation of the HVAC system 100. In a typical embodiment, the HVAC controller 150 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101. In a typical embodiment, the HVAC controller 150 also includes a processor and a memory to direct operation of the HVAC system 100 including, for example, a speed of the variable-speed circulation fan 110.

Still referring to FIG. 1, in some embodiments, the plurality of environment sensors 160 are associated with the HVAC controller 150 and also optionally associated with a user interface 170. The plurality of environment sensors 160 provide environmental information within a zone or zones of the enclosed space 101 such as, for example, temperature and humidity of the enclosed space 101 to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101, and calculate operational parameters of the HVAC system 100 as disclosed herein.

In a typical embodiment, the HVAC system 100 is configured to communicate with a plurality of devices such as, for example, a communication device 155, a monitoring device 156, and the like. In a typical embodiment, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In a typical embodiment, the zone controller 180 operates electronic dampers 185 to control air flow to the zones of the enclosed space 101.

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the variable-speed circulation fan 110, the variable-speed compressor 140, or the plurality of environment sensors 160.

Figure 2:
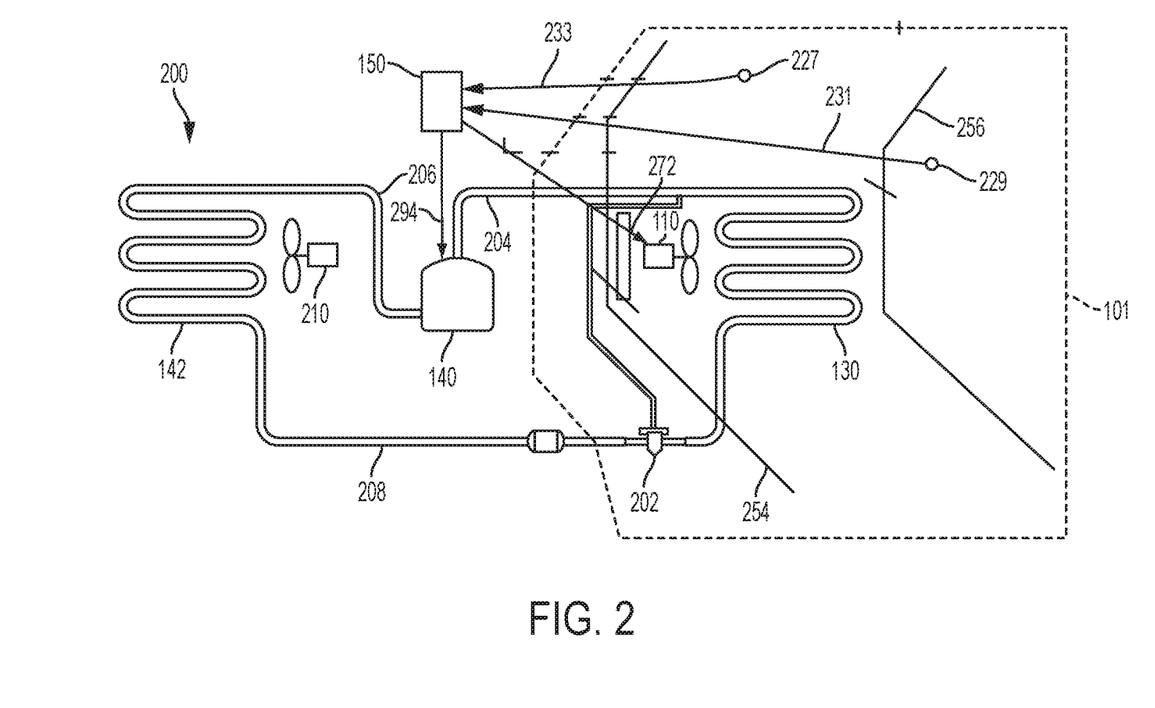
FIG. 2 is a schematic diagram of an exemplary HVAC system.

FIG. 2 is a schematic diagram of an exemplary HVAC system 200. For illustrative purposes, FIG. 2 will be described herein relative to FIG. 1. The HVAC system 200 includes the refrigerant evaporator coil 130, the condenser coil 142, the variable-speed compressor 140, and a metering device 202. In a typical embodiment, the metering device 202 is, for example, a thermostatic expansion valve or a throttling valve. The refrigerant evaporator coil 130 is fluidly coupled to the variable-speed compressor 140 via a suction line 204. The variable-speed compressor 140 is fluidly coupled to the condenser coil 142 via a discharge line 206. The condenser coil 142 is fluidly coupled to the metering device 202 via a liquid line 208.

Still referring to FIG. 2, during operation, low-pressure, low-temperature refrigerant is circulated through the refrigerant evaporator coil 130. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the refrigerant evaporator coil 130 by the variable-speed circulation fan 110. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the variable-speed compressor 140 via the suction line 204. In a typical embodiment, the variable-speed compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant enters the condenser coil 142.

Outside air is circulated around the condenser coil 142 by a variable-speed condenser fan 210. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the refrigerant evaporator coil 130. Abrupt reduction of the pressure of the high-pressure, high-temperature, sub-cooled liquid refrigerant causes rapid evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the refrigerant evaporator coil 130.

Referring to FIG. 2, a first temperature sensor 227 is disposed in the supply duct 256. In a typical embodiment, the first temperature sensor 227 is a thermocouple, a thermometer, or other appropriate temperature-measuring device. The first temperature sensor 227 measures the discharge air temperature and transmits the discharge air temperature to the HVAC controller 150. Communication between the first temperature sensor 227 and the HVAC controller 150 is illustrated graphically in FIG. 2 by arrow 233. In a typical embodiment, the first temperature sensor 227 continuously measures the discharge air temperature; however, in other embodiments, the first temperature sensor 227 measures the discharge air temperature at periodic time intervals such as, for example, every five seconds. In a typical embodiment, the first temperature sensor 227 is electrically coupled to the HVAC controller 150 via a wired connection; however, in other embodiments, the first temperature sensor 227 is connected to the HVAC controller 150 via a wireless connection. A second temperature sensor 229 is disposed in the enclosed space 101. In a typical embodiment, the second temperature sensor 229 is a thermocouple, a thermometer, or other appropriate temperature-measuring device. The second temperature sensor 229 measures an air temperature within the enclosed space 101. In various embodiments, the second temperature sensor 229 and the HVAC controller 150 are integral; however, in other embodiments, the second temperature sensor 229 and the HVAC controller 150 are separate devices thereby allowing the HVAC controller to be located outside of the enclosed space 101. In a typical embodiment, the second temperature sensor 229 continuously measures the temperature of the enclosed space 101; however, in other embodiments, the second temperature sensor 229 measures the temperature of the enclosed space 101 at periodic time intervals such as, for example, every five seconds. In a typical embodiment, the second temperature sensor 229 is electrically coupled to the HVAC controller 150 via a wired connection; however, in other embodiments, the second temperature sensor 229 is connected to the HVAC controller 150 via a wireless connection. Communication between the second temperature sensor 229 and the HVAC controller 150 is illustrated graphically in FIG. 2 by arrow 231.

Still referring to FIG. 2, the second temperature sensor 229 measures the temperature of the enclosed space 101. In a typical embodiment, the temperature measured by the second temperature sensor 229 is a dry-bulb temperature. That is, the temperature measured by the temperature sensor 229 is a temperature measured according to a dry-bulb thermometer independent of the relative humidity of the enclosed space 101. The second temperature sensor 229 transmits the temperature of the enclosed space 101 to the HVAC controller 150. When the temperature of the enclosed space 101 is at or above a maximum threshold such as, for example, 80° F., the HVAC controller 150 modulates the speed of at least one of the variable-speed compressor 140 and the variable-speed circulation fan 110 to establish the discharge air temperature at a first setpoint temperature such as, for example, approximately 50° F. Modulation of the variable-speed compressor 140 and the variable-speed circulation fan 110 varies the discharge air temperature according to Equation 2. Signaling of the variable-speed compressor 140 by the HVAC controller 150 is illustrated in FIG. 2 by way of arrow 294. Signaling of the variable-speed circulation fan 110 by the HVAC controller 150 is illustrated in FIG. 2 by arrow 272. When the temperature of the enclosed space 101 is at or below a minimum threshold such as, for example, 70° F., the HVAC controller 150 modulates the speed of the variable-speed compressor 140 and the variable-speed circulation fan 110 to establish the discharge air temperature at a second setpoint temperature such as, for example, 45° F., thereby lowering the discharge air temperature from the first setpoint temperature to the second setpoint temperature as the temperature of the enclosed space 101 falls. In a typical embodiment, the minimum threshold, the maximum threshold, the first setpoint temperature, and the second setpoint temperature may be adjusted according to the preferences of an occupant of the enclosed space 101. When the temperature of the enclosed space 101 is between the maximum threshold and the minimum threshold such as, for example, between 70° F. and 80° F. the HVAC controller 150 modulates the speed of the variable-speed compressor 140 and the variable-speed circulation fan 110 to vary the discharge air temperature between the first setpoint temperature and the second setpoint temperature in a linear fashion relative to the temperature of the enclosed space 101. In a typical embodiment, cooling demand of the HVAC system 200 will be tied to one of the speed of the variable-speed compressor 140 and the speed of the variable-speed circulation fan 110. In embodiments where cooling demand is tied to the speed of the variable-speed compressor 140, the speed of the variable-speed circulation fan 110 will be adjusted. In embodiments where cooling demand is tied to the speed of the variable-speed circulation fan 110, the speed of the variable-speed compressor 140 will be adjusted.

Still referring to FIG. 2, variation of the discharge air temperature with the temperature of the enclosed space 101 causes the S/T ratio to decrease thereby increasing a latent capacity of the HVAC system 200. Thus, with a lower S/T ratio, the HVAC system 200 is able to remove a greater quantity of moisture from air within the enclosed space 101. Additionally, variation of the discharge air temperature with the temperature of the enclosed space 101 often results in the HVAC system 200 running for longer periods of time. Longer run times prevents problems associated with on/off cycling such as, for example, re-evaporation of removed moisture that accumulates on the evaporator coil 130 during operation of the HVAC system 200. Furthermore, variation of the discharge air temperature by modulation of the speed of the variable-speed compressor 140 and the speed of the variable-speed circulation fan 110 often results in the variable-speed compressor 140 and the variable-speed circulation fan operating at lower-than-maximum speeds. Such conditions result in the HVAC system 200 consuming less power, despite increased operating times of the HVAC system 200.

Still referring to FIG. 2, the discharge air temperature has a lower limit that is dictated by the freezing point of moisture on the evaporator coil 130. Thus, if the coil refrigerant temperature approaches a freezing point of the refrigerant in the evaporator coil 130, frost will begin to form on the evaporator coil 130 causing an increased risk of damage to the evaporator coil 130 and other components of the HVAC system 200. By establishing the second setpoint temperature at approximately 45° F. the HVAC controller 150 ensures that the discharge air temperature remains above the freezing point of water. In a typical embodiment, saturated suction pressure is used to approximate a temperature of the evaporator coil 130. Thus, in a typical embodiment, the saturated suction pressure will be maintained at approximately 110 psi or above.

Figure 3:
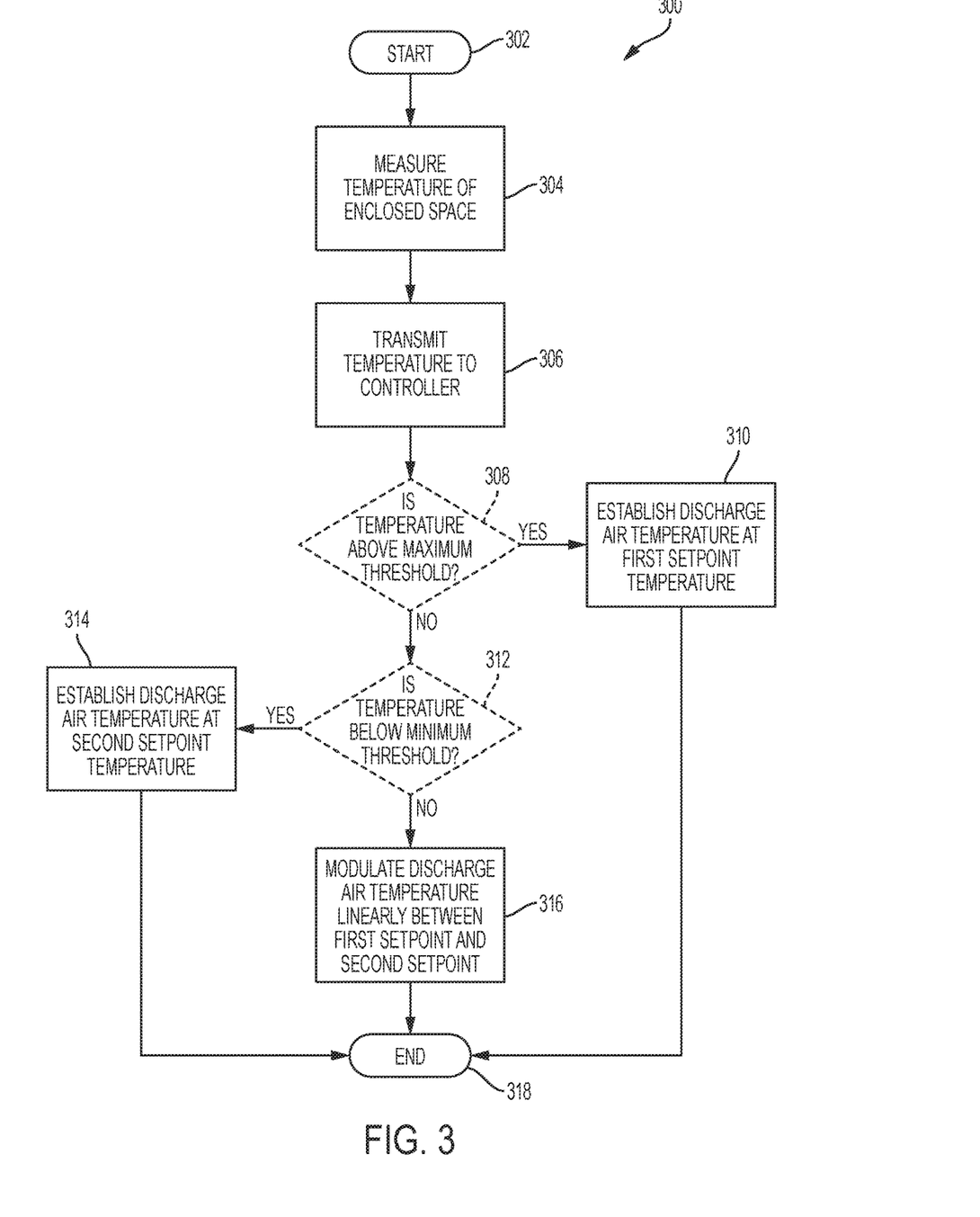
FIG. 3 is a flow diagram illustrating a method for optimizing latent capacity of a variable-speed compressor system according to an exemplary embodiment.

FIG. 3 is a flow diagram of a process 300 for optimizing latent capacity of a variable-speed compressor system. For illustrative purposes, the process 300 will be described relative to FIGS. 1-2B. The process 300 starts at step 302. At step 304, the second temperature sensor 229 measures a temperature of the enclosed space 101. At step 306, the second temperature sensor 229 transmits the temperature of the enclosed space 101 to the HVAC controller 150. At step 308, the HVAC controller 150 determines if the temperature of the enclosed space 101 is above a maximum threshold such as, for example, approximately 80° F. If it is determined at step 308 that the temperature of the enclosed space 101 is at or above the maximum threshold, the process 300 proceeds to step 310. At step 310, the HVAC controller modulates the speed of the variable-speed compressor 140 and the speed of the variable-speed circulation fan 110 to establish the discharge air temperature at a first setpoint temperature such as, for example, approximately 50° F. However, if it is determined at step 308 that the temperature of the enclosed space 101 is below the maximum threshold, the process 300 proceeds to step 312.

At step 312, the HVAC controller 150 determines if the temperature of the enclosed space 101 is at or below a minimum threshold such as, for example, approximately 70° F. If it is determined at step 312 that the temperature of the enclosed space 101 is below the minimum threshold, the process 300 proceeds to step 314. At step 314, the HVAC controller modulates the speed of the variable-speed compressor 140 and the speed of the variable-speed circulation fan 110 to establish the discharge air temperature at a second setpoint temperature such as, for example, approximately 45° F. However, if it is determined at step 312 that the temperature of the enclosed space 101 is between the minimum threshold and the maximum threshold, the process 300 proceeds to step 316. At step 316, the HVAC controller 150 modulates the speed of the variable-speed compressor 140 and the variable-speed circulation fan 110 so as to vary the discharge air temperature with the temperature of the enclosed space 101 in a linear fashion. Thus, the discharge air temperature varies proportionally with the temperature of the enclosed space 101 when the temperature of the enclosed space 101 is between the maximum threshold and the minimum threshold such as, for example, 70° F. and 80° F. The process 300 ends at step 318. In a typical embodiment, the minimum threshold, the maximum threshold, the first setpoint temperature, and the second setpoint temperature may be adjusted according to the preferences of an occupant of the enclosed space 101.

Figure 4A:
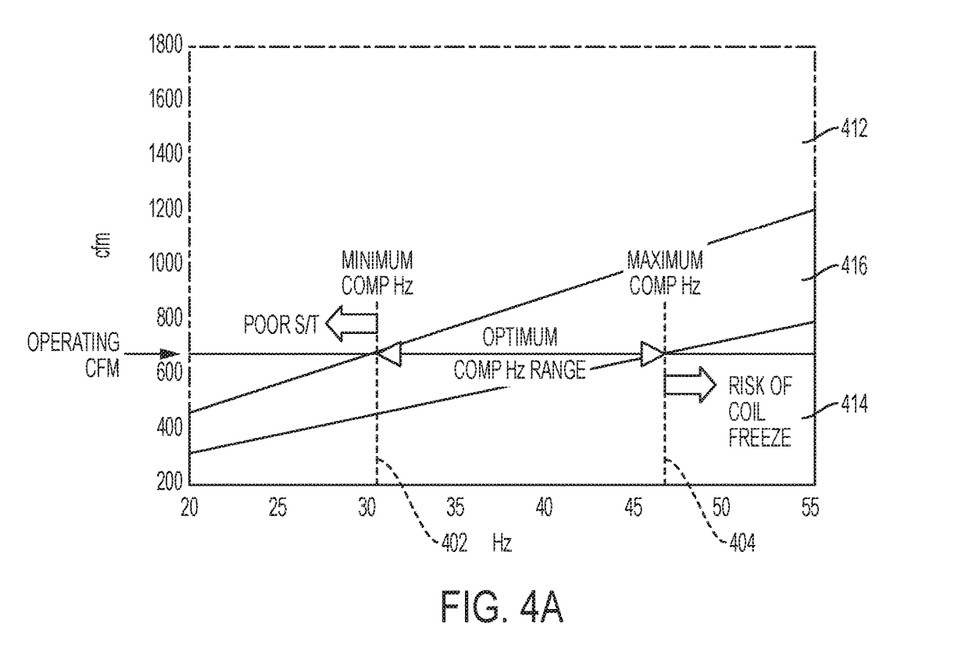
FIG. 4A is a chart illustrating how a speed of a variable-speed compressor is adjusted to achieve a favorable S/T ratio of an HVAC system according to an exemplary embodiment.

FIG. 4A is a chart illustrating how a speed of the variable-speed compressor 140 is adjusted to achieve a favorable S/T ratio of the HVAC system 200. In the embodiment illustrated in FIG. 4A, a speed of the variable-speed circulation fan 110 is determined by the cooling load of the HVAC system 200. As discussed above, in such an embodiment, a desired discharge air temperature setpoint is established by adjusting a speed of the variable-speed compressor 140. As shown in FIG. 4A, for a particular speed of the variable-speed circulation fan 110, there exists an optimal range of speeds of the variable-speed compressor 140. If the speed of the variable-speed compressor is below a minimum boundary 402, then the HVAC system 200 will exhibit a high S/T ratio and will have inadequate moisture removal capacity. This is illustrated by zone 412 in FIG. 4A. If the speed of the variable-speed compressor 140 is above the maximum boundary 404, then the HVAC system 200 is at risk for freezing the evaporator coil 130 and causing damage to the HVAC system 200. This is illustrated by zone 414 in FIG. 4A. If the speed of the variable-speed compressor 140 is between the minimum boundary 402 and the maximum boundary 404, the HVAC system exhibits an S/T ratio that is optimal for moisture removal. This is illustrated in FIG. 4A by zone 416.

Figure 4B:
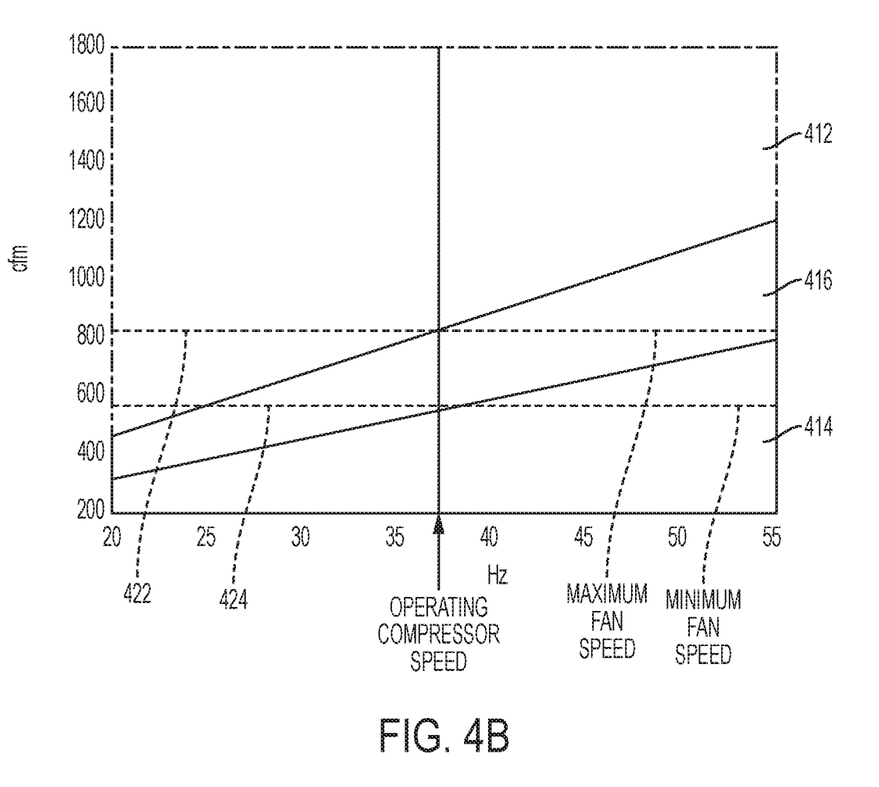
FIG. 4B is a chart illustrating how a speed of a variable-speed circulation fan is adjusted to achieve a favorable S/T ratio of an HVAC system according to an exemplary embodiment.

FIG. 4B is a chart illustrating how a speed of the variable-speed circulation fan 110 is adjusted to achieve a favorable S/T ratio of the HVAC system 200. In the embodiment illustrated in FIG. 4B, a speed of the variable-speed compressor 140 is determined by the cooling load of the HVAC system 200. As discussed above, in such an embodiment, a desired discharge air temperature setpoint is established by adjusting a speed of the variable-speed circulation fan 110. As shown in FIG. 4B, for a particular speed of the variable-speed compressor 140, there exists an optimal range of speeds of the variable-speed circulation fan 110. If the speed of the variable-speed circulation fan 110 is below a minimum boundary 422, then the HVAC system 200 will exhibit a high S/T ratio and will have inadequate moisture removal capacity. This is illustrated by the zone 412. If the speed of the variable-speed circulation fan 110 is above the maximum boundary 424, then the HVAC system 200 is at risk of freezing the evaporator coil 130 and causing damage to the HVAC system 200. This is illustrated by the zone 414. If the speed of the variable-speed compressor 140 is between the minimum boundary 402 and the maximum boundary 404, the HVAC system exhibits an S/T ratio that is optimal for moisture removal. This is illustrated in FIG. 4A by zone 416.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the HVAC controller 150, one or more portions of the user interface 170, one or more portions of the zone controller 180, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C. Python. Java. or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML). Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning (HVAC) system comprising:
   a variable-speed circulation fan for circulating air around an evaporator coil;
   a variable-speed compressor fluidly coupled to a condenser coil and the evaporator coil; and
   a controller coupled to the variable-speed compressor and the variable-speed circulation fan;
   wherein the controller is configured to:
      receive, via a temperature sensor disposed in an enclosed space, temperature of the enclosed space;
      determine if the temperature of the enclosed space is below a minimum threshold; and responsive to a determination that the temperature of the enclosed space is below the minimum threshold, modulate at least one of a speed of the variable-speed compressor and the variable-speed circulation fan to lower a discharge air temperature from a first setpoint temperature to a second setpoint temperature.

2. The HVAC system of claim 1, wherein the controller is configured to:
determine if the temperature of the enclosed space is above a maximum threshold; and
responsive to a determination that the temperature of the enclosed space is above the maximum threshold, modulate at least one of the speed of the variable-speed compressor and the variable-speed circulation fan to maintain the discharge air temperature at the first setpoint temperature.

3. The HVAC system of claim 2, wherein the controller is configured to, responsive to a determination that the temperature of the enclosed space is between the minimum threshold and the maximum threshold, modulate at least one of the speed of the variable-speed compressor and the variable-speed circulation fan to vary the discharge air temperature in between the first setpoint temperature and the second setpoint temperature.

4. The HVAC system of claim 1, wherein the HVAC system is a package HVAC system.

5. The HVAC system of claim 1, wherein the HVAC system is a split HVAC system.

6. The HVAC system of claim 1, wherein the controller is configured to establish, at a particular cooling demand level, a minimum speed and a maximum speed of at least one of the variable-speed circulation fan and the variable-speed compressor.

7. The system of claim 6, wherein, responsive to a change in the particular cooling demand level, the minimum speed and the maximum speed of at least one of the variable-speed circulation fan and the variable-speed compressor are adjusted.

8. The HVAC system of claim 1, wherein modulating at least one of the speed of the variable-speed compressor and the variable-speed circulation fan to lower the discharge air temperature increases a latent capacity of the HVAC system.

9. The HVAC system of claim 1, wherein modulating at least one of the speed of the variable-speed compressor and the variable-speed circulation fan to lower the discharge air temperature increases a run time of the HVAC system.

10. The HVAC system of claim 9, wherein increasing the run time of the HVAC system reduces re-evaporation of moisture removed by the HVAC system.

11. The HVAC system of claim 1, wherein modulating at least one of the speed of the variable-speed compressor and the variable-speed circulation fan to lower the discharge air temperature reduces power consumption of the HVAC system.

12. A method of optimizing latent capacity of an HVAC system, the method comprising:
measuring, using a first temperature sensor, a discharge air temperature;
measuring, using a second temperature sensor, an air temperature of an enclosed space;
determining, using a controller, if the temperature of the enclosed space is above a maximum threshold; and
responsive to a determination that the temperature of the enclosed space is above the maximum threshold, modulating at least one of the speed of the variable-speed compressor and the variable-speed circulation fan to maintain the discharge air temperature at a first setpoint temperature.

13. The method of claim 12, comprising:
determining if the temperature of the enclosed space is below a minimum threshold; and
responsive to a determination that the temperature of the enclosed space is below the minimum threshold, modulating, using the controller, a speed of at least one of a variable-speed compressor and a variable-speed circulation fan to lower the discharge air temperature from the first setpoint temperature to a second setpoint temperature.

14. The method of claim 13, wherein responsive to a determination that the temperature of the enclosed space is between the minimum threshold and the maximum threshold, modulating at least one of the speed of the variable-speed compressor and the variable-speed circulation fan to vary the discharge air temperature in between the first setpoint temperature and the second setpoint temperature in a linear fashion with the temperature of the enclosed space.

15. The method of claim 12, comprising measuring temperature of the enclosed space at periodic time intervals.

16. The method of claim 15, wherein the periodic time intervals comprise approximately five seconds.

17. The method of claim 12, comprising measuring the temperature of the enclosed space continuously.

18. The method of claim 12, comprising optimizing the latent capacity of the HVAC system.

19. A heating, ventilation, and air conditioning (HVAC) system comprising:
a variable-speed circulation fan for circulating air around an evaporator coil;
a variable-speed compressor fluidly coupled to a condenser coil and the evaporator coil; and
a controller operatively coupled to the variable-speed compressor and the variable-speed circulation fan;
wherein the controller is configured to:
receive, via a first temperature sensor disposed proximate the evaporator coil, a discharge air temperature;
receive, via a second temperature sensor disposed in an enclosed space, the air temperature of the enclosed space;
determine if the temperature of the enclosed space is below a minimum threshold;
responsive to a determination that the temperature of the enclosed space is below the minimum threshold, modulate at least one of a speed of the variable-speed compressor and the variable-speed circulation fan to lower the discharge air temperature from a first setpoint temperature to a second setpoint temperature;
determine if the temperature of the enclosed space is between the minimum threshold and a maximum threshold; and
responsive to a determination that the temperature of the enclosed space is between the minimum threshold and the maximum threshold, modulate at least one of the speed of the variable-speed compressor and the variable-speed circulation fan to vary the discharge air temperature in between the first setpoint temperature and the second setpoint temperature in a linear fashion with the temperature of the enclosed space.

20. The HVAC system of claim 19, wherein the controller is configured to:

determine if the temperature of the enclosed space is above the maximum threshold; and responsive to a determination that the temperature of the enclosed space is above the maximum threshold, modulate at least one of the speed of the variable-speed compressor and the variable-speed circulation fan to maintain the discharge air temperature at the first setpoint temperature.

\* \* \* \* \*